(12) United States Patent
Clement et al.

(10) Patent No.: US 8,509,687 B1
(45) Date of Patent: Aug. 13, 2013

(54) QUIET SPOT DETECTION FOR FM TRANSMISSION

(75) Inventors: Patrick Clement, Belmont (CH); Lydi Smaini, Lausanne (CH)

(73) Assignee: Marvell International Ltd., Hamilton (BM)

(*) Notice: Subject to any disclaimer, the term of this patent is extended or adjusted under 35 U.S.C. 154(b) by 910 days.

(21) Appl. No.: 12/638,879

(22) Filed: Dec. 15, 2009

Related U.S. Application Data (63) Continuation-in-part of application No. 11/970,443, filed on Jan. 7, 2008, now Pat. No. 7,953,382.

(60) Provisional application No. 61/173,923, filed on Apr. 29, 2009, provisional application No. 60/883,581, filed on Jan. 5, 2007.

(51) Int. Cl.
*H04B 7/00* (2006.01)

(52) U.S. Cl.
USPC ............ 455/41.2; 455/67.11; 455/67.13; 455/68; 455/69; 455/569.1; 455/569.2; 455/522; 455/161.1; 455/161.2; 455/161.3; 455/3.01; 455/3.02; 455/3.04; 455/3.06; 455/11.1

(58) Field of Classification Search
USPC ............ 455/41.2–41.3, 67.11, 67.13, 556.1, 455/556.2, 569.1, 569.2, 91, 99, 522, 161.1–161.3, 455/3.01, 3.02, 3.04, 3.05, 3.06, 11.1, 68, 455/69
See application file for complete search history.

(56) References Cited

U.S. PATENT DOCUMENTS

| | | | |
|---|---|---|---|
| 6,131,038 A | 10/2000 | Sekine | |
| 6,782,239 B2* | 8/2004 | Johnson et al. | 455/42 |
| 6,810,233 B2* | 10/2004 | Patsiokas | 455/3.02 |
| 7,062,238 B2* | 6/2006 | Glaza | 455/161.1 |
| 7,792,498 B2* | 9/2010 | Tsfaty et al. | 455/88 |
| 7,953,382 B1 | 5/2011 | Clement et al. | |
| 7,957,696 B2* | 6/2011 | Der | 455/41.2 |
| 2003/0036357 A1 | 2/2003 | McGowan | |
| 2006/0293007 A1 | 12/2006 | Kim | |

OTHER PUBLICATIONS

Information technology—Telecommunications and information exchange between systems—Local and metropolitan area networks—Specific requirements—Part 11: Wireless LAN Medium Access Control (MAC) and Physical Layer (PHY) specifications, Aug. 20, 1999, pp. 1-531, ISO/IEC 8802-11, The Institute of Electrical and Electronics Engineers, Inc., New York, NY.

(Continued)

*Primary Examiner* — Tuan A Tran (57) ABSTRACT

Embodiments of the present disclosure provide a device comprising a receiver port configured to be operatively coupled to a local receiver antenna; a transmitter port configured to be operatively coupled to a local transmitter antenna and to receive signals received by the local transmitter antenna at least for a portion of time while the local receiver antenna is not operatively coupled to the receiver port; and a quiet spot determination unit configured to receive signals received by the local receiver antenna at least for a portion of time while the local receiver antenna is operatively coupled to the receiver port, receive signals received by the local transmitter antenna at least for the portion of time while the local receiver antenna is not operatively coupled to the receiver port, and determine a quiet spot frequency. Other embodiments are also described and claimed.

18 Claims, 4 Drawing Sheets

(56) References Cited

OTHER PUBLICATIONS

Draft Standard for Information Technology—Telecommunications and information exchange between systems—Local and metropolitan area networks—Specific requirements—Part 11: Wireless LAN Medium Access Control (MAC) and Physical Layer (PHY) specifications—Amendment: Radio Resource Measurement, Jan. 2007, pp. 1-194, IEEE Computer Society, New York, NY.

* cited by examiner

QUIET SPOT DETECTION FOR FM TRANSMISSION

CROSS REFERENCE TO RELATED APPLICATIONS

The present application claims priority to U.S. Provisional Patent Application No. 61/173,923, filed Apr. 29, 2009, and is a continuation in part of U.S. patent application Ser. No. 11/970,443, filed Jan. 7, 2008, which claims priority to U.S. Provisional Patent Application No. 60/883,581, filed Jan. 5, 2007, the entire specifications of which are hereby incorporated by reference in their entireties for all purposes, except for those sections, if any, that are inconsistent with this specification.

TECHNICAL FIELD

Embodiments of the present disclosure relate generally to frequency modulated (FM) signal transmission, and more particularly, to quiet detection for FM transmission.

BACKGROUND

Portable electronic devices, such as digital audio players, mobile telephones, and the like, have become increasingly popular. These devices generally require a user to hold the device to their ear either directly or indirectly by way of an earphone or a headset. Although these devices perform well for a single user, users sometimes find that amplifying the sound produced by these devices, for either multiple listeners or for "hands-free" use, is desired.

Radio transmitters may transmit audio signals from a device, such as a portable electronic device, to be detected by a remote radio receiver. In general, a transmitter is programmed to be switched between a few pre-determined channels, the user selecting one of the channels for transmitting the audio signals. The use of a transmitter usually requires a user to manually locate the available channels on a radio band to determine which channel is sufficiently quiet for transmitting the audio signals. The user generally determines which of the channels is quiet by listening directly to the quality of signals on the available channels. Once the user has identified a quiet spot, the user switches the transmitter to the selected channel and enables the electronic device. After starting up or enabling the electronic device, the device then transmits audio signals to the remote radio receiver.

For example, a user may use a transmitter in a digital audio player (e.g., an MP3 player) to wirelessly transmit music from the digital audio player over an identified quiet spot frequency to a car audio system, and may tune a receiver of the car audio system to the quiet spot frequency such that the car audio system receives and plays the music transmitted by the digital audio player.

In some cases, a quiet spot on a radio band becomes non-quiet due to, for example, movement of the device closer to a location of a transmitter of a radio station that broadcasts on the particular frequency of the selected quiet spot. For example, a user uses a transmitter in a digital audio player vehicle to transmit music over the selected quiet spot frequency, to be received and played by a car radio receiver. While driving, the music may be interrupted by a radio station broadcasting on the same frequency of the quiet spot. This may be due to the radio station's signal becoming stronger as the user drives closer to the source of the radio station's signal. Resultantly, the user has to repeat the process for finding another quiet spot. In some larger urban areas, the user may encounter extreme difficulties in locating and/or maintaining a quiet spot, due to large number of radio stations present in the urban area. In addition to the possible dangers of requiring the user to repeatedly locate quiet spots while driving, frustration may lead the user to forego use of the transmitter altogether.

The description in this section is related art, and does not necessarily include information disclosed under 37 C.F.R. 1.97 and 37 C.F.R. 1.98. Unless specifically denoted as prior art, it is not admitted that any description of related art is prior art.

SUMMARY

In an embodiment, the present disclosure provides a device comprising a receiver port configured to be operatively coupled to a local receiver antenna; a transmitter port configured to be operatively coupled to a local transmitter antenna and to receive signals received by the local transmitter antenna at least for a portion of time while the local receiver antenna is not operatively coupled to the receiver port; and a quiet spot determination unit configured to receive signals received by the local receiver antenna at least for a portion of time while the local receiver antenna is operatively coupled to the receiver port; receive signals received by the local transmitter antenna at least for the portion of time while the local receiver antenna is not operatively coupled to the receiver port; and determine a quiet spot frequency. In various embodiments, the quiet spot determination unit is further configured to evaluate at least signal strength or signal to noise ratio for each of a plurality of frequencies of a frequency band based at least in part on signals received from the local receiver antenna or the local transmitter antenna; and determine the quiet spot frequency from the plurality of frequencies, based at least in part on the evaluated signal strengths or signal to noise ratios.

The quiet spot determination unit is further configured to periodically evaluate the determined quiet spot frequency to determine if the determined quiet spot frequency has become non-quiet; and re-evaluate the signal strength or the signal to noise ratio for each of the plurality of frequencies to determine another quiet spot frequency if the determined quiet spot frequency has become non-quiet. The quiet spot determination unit is further configured to determine that the quiet spot frequency has become non-quiet if the signal strength or the signal to noise ratio of the determined quiet spot frequency becomes higher than a threshold signal strength or a threshold signal to noise ratio, respectively.

There is also provided a method that comprises, in various embodiments, evaluating at least a signal strength and signal to noise ratio for each of a plurality of frequencies of a frequency band; determining a quiet spot frequency from the plurality of frequencies, based at least in part on the evaluated signal strengths and signal to noise ratios; and transmitting signals at the determined quiet spot frequency. The method further comprises periodically evaluating the quiet spot frequency to determine if the quiet spot frequency has become non-quiet; and if the evaluated quiet spot frequency has become non-quiet, re-evaluating the signal strength or the signal to noise ratio for each of the plurality of frequencies to re-determine another quiet spot frequency. Evaluating the signal strength and the signal to noise ratio for each of the plurality of frequencies further comprises in case a local receiver antenna is operatively coupled to a receiver port, tuning a local receiver to each of the plurality of frequencies to receive signals of each of the plurality of frequencies that are being broadcast and that are received by the local receiver antenna; in case the local receiver antenna is not operatively coupled to the receiver port, tuning the local receiver to each of the plurality of frequencies to receive the signals of each of the plurality of frequencies that are being broadcast and that are received by a local transmitter antenna; and evaluating the signal strength and the signal to noise ratio for each of the plurality of frequencies based at least in part on signals received by the local receiver antenna or the local transmitter antenna.

There is also provided, in accordance with various embodiments, a method comprising tuning a device to each of a plurality of frequencies in a frequency band to receive signals of each of the plurality of frequencies that are being broadcast; evaluating at least signal strength and signal to noise ratio for each of the plurality of frequencies, based at least in part on said tuning; and determining a quiet spot frequency from the plurality of frequencies, based at least in part on the evaluated signal strengths and signal to noise ratios. Tuning to each of the plurality of frequencies further comprises tuning the device to each of the plurality of frequencies received by a local receiver antenna in case the local receiver antenna is operatively coupled to a receiver port of the device; and tuning the device to each of the plurality of frequencies received by a local transmitter antenna in case a local receiver is not operatively coupled to the receiver port.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

In the following detailed description, reference is made to the accompanying drawings which form a part hereof, wherein like numerals designate like parts throughout. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A/B" means A or B. For the purposes of the present disclosure, the phrase "A and/or B" means "(A), (B), or (A and B)." For the purposes of the present disclosure, the phrase at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "remote" and "local" as used herein may not necessarily refer to locations of the referred-to features but they may, depending on the context.

Figure 1:
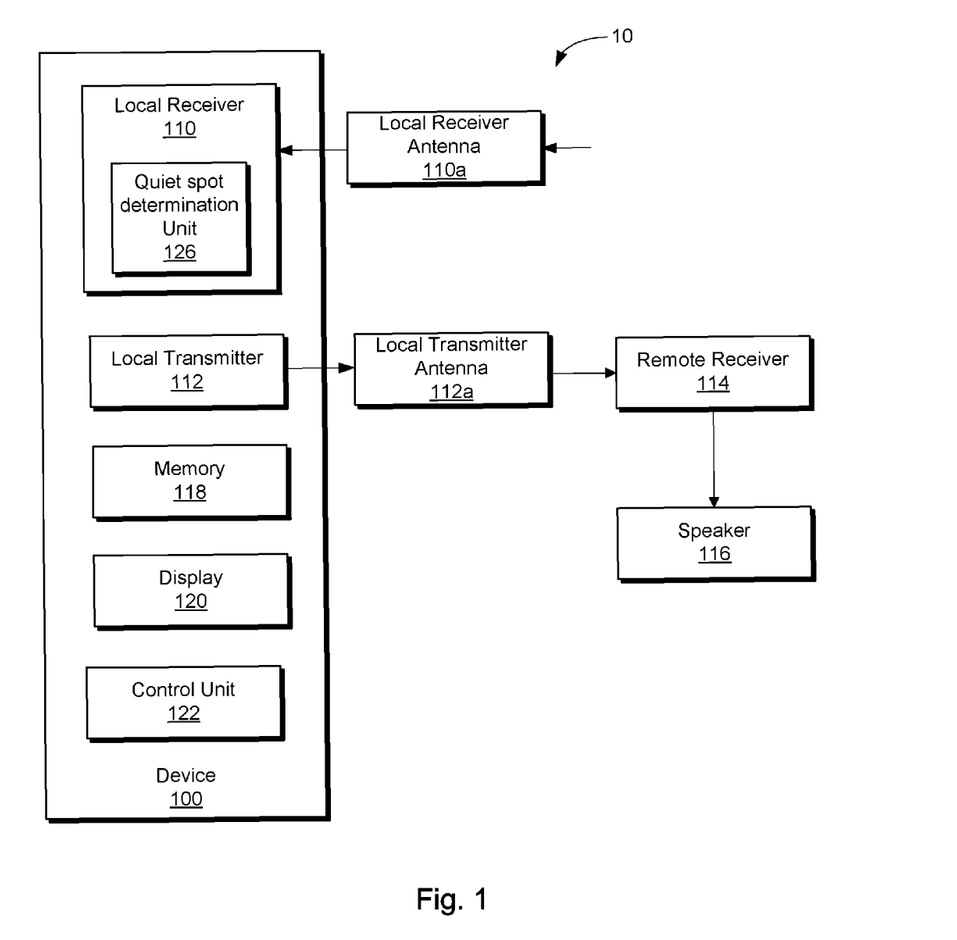
FIG. 1 schematically illustrates a system incorporating a device for quiet spot detection and transmission, in accordance with various embodiments of the present disclosure.

FIG. 1 schematically illustrates a system 10 incorporating a device 100 for quiet spot detection and transmission, in accordance with various embodiments of the present disclosure. Device 100 is any appropriate portable electronic device configured to transmit audio signals based at least in part on data stored on a memory device of or otherwise received by device 100. For example, device 100 is an audio player (e.g., a MP3 player, a compact disk (CD) player, a digital versatile disc or digital video disc (DVD) player, or the like) configured to transmit signals based on data stored on a CD, a DVD, any suitable memory format, or the like. In various embodiments, device 100 may also be a wireless handheld device, such as a mobile telephone, a personal digital assistant, a smartphone, or the like.

Device 100 comprises a local receiver antenna 110a configured to receive signals of one or more communication frequencies. Although illustrated as being located outside the device 100, in various embodiments, the local receiver antenna 110a is associated with, and/or is a part of the device 100. In various embodiments, a local receiver 110 is configured to process signals received by the local receiver antenna 110a. The local receiver 110 is configured to scan a selected one or both of the frequency modulation (FM) band and the amplitude modulation (AM) band.

As used herein, a "quiet spot" (or a quiet spot frequency, sometimes also referred to as "clean spot" or "sweet spot") refers to a frequency of a frequency band having a signal strength lower than one or more other frequencies of the frequency band. In various embodiments, the frequency band may be, for example, radio frequency band. Whether a frequency is considered a quiet spot is determined, for example, based at least in part on a predetermined threshold signal strength such that a frequency having a signal strength below the predetermined threshold is considered a quiet spot. Whether a frequency is considered a quiet spot is determined based at least in part on relative signal strengths among two or more frequencies such that a frequency is considered a quiet spot if the frequency has a signal strength lower than that of at least one other frequency. A wide variety of alternate and/or equivalent embodiments or implementations calculated to determine whether a frequency is a quiet spot may be substituted for the embodiments shown and described without departing from the scope of the present disclosure. In various embodiments, the local receiver 110 includes a quiet spot determination unit 126 to determine one or more quiet spot frequencies. In various other embodiments, although not illustrated in FIG. 1, the quiet spot determination unit 126 may be separate from, but coupled to, the local receiver 110.

Signal strength is determined according to any method suitable for doing so. For example, signal strength is determined according to an Institute of Electrical and Electronics Engineers (IEEE) wireless standard, e.g., the 802.11-2007 standards along with any revisions, amendments or updates thereto. For example, the proposed 802.11k standards for Received Signal Strength Indication (RSSI) are used for determining signal strength. For determining signal strength, device 100 includes a received signal strength indicator (e.g., which may be associated with or be a part of the quiet spot determination unit 126) adapted for evaluating signal strength of signals received by the local receiver antenna 110a and processed by the local receiver 110. The received signal strength indicator may be formed on the same chip as local receiver 110, or may be a separate chip of device 100.

In addition to or instead of the above discussed signal strength, in various embodiments, signal to noise ratio (e.g., FM signal to noise ratio) is also considered while determining the quiet spot frequency. For example, a constant modulation indication (CMI) of a signal for a given frequency is an indication of signal to noise ratio for that frequency. CMI is also considered, in addition to (or instead of) signal strength (e.g., measured using RSSI), while determining the quiet spot frequency. Whether a frequency is considered a quiet spot is determined based at least in part on signal to noise ratio (e.g., FM signal to noise ratio) among two or more frequencies, such that a frequency is considered a quiet spot if the frequency has a lower signal to noise ratio (e.g., lower FM signal to noise ratio) than that of at least one other frequency. For a frequency band, a relatively high signal to noise ratio signal indicates a presence of signal in that frequency, whereas a relatively low signal to noise ratio signal indicates a presence of noise in that frequency. For determining signal to noise ratio, device 100 includes a signal to noise ratio indicator (e.g., which may be associated with or be a part of the quiet spot determination unit 126) adapted for evaluating signal to noise ratio of signals of various frequencies detected by the local receiver 110. The signal to noise ratio indicator may be formed on the same chip as local receiver 110, or may be a separate chip of device 100. Determination of signal to noise ratio (e.g., by determining an associated CMI) for a frequency band is performed using any suitable method for doing so.

The quiet spot determination unit 126 receives signals received by the local receiver antenna 110a, and determines signal strength and/or signal to noise ratio for various frequencies in the frequency band that is scanned by the local receiver 110. Using the determined signal strength indication and/or the signal to noise ratio indication, the quiet spot determination unit 126 determines one or more quiet spot frequencies. For example, whether a frequency is considered a quiet spot is determined based at least in part on a predetermined threshold signal strength and/or a predetermined threshold signal to noise ratio, such that a frequency having a signal strength and/or a signal to noise ratio below the respective predetermined thresholds is considered a quiet spot.

Device 100 further comprises a local transmitter antenna 112a configured to transmit signals at one or more of the detected quiet spot frequencies. The local transmitter antenna 112a is, for example, a printed circuit board (PCB) loop antenna, a patch antenna, or the like. In various embodiments, a local transmitter 112 processes signals before transmission by the local transmitter antenna 112a. Although illustrated as being located outside the device 100, in various embodiments, the local transmitter antenna 112a is associated with, and/or is a part of the device 100. In various embodiments, the local receiver 110 and the local transmitter 112 may be integrated on a single chip. Accordingly, the size of device 100 is minimally impacted, if at all, by inclusion of local receiver 110 and the local transmitter 112 into device 100. In some applications, however, the local receiver 110 and the local transmitter 112 are formed on separate chips and then integrated into device 100.

In various embodiments, in system 10, signals transmitted at the detected quiet spot frequency by device 100 are detected by a sound producing arrangement that includes a remote receiver 114 and one or more speakers 116. Remote receiver 114 is configured to convert the received signals into sounds projected by one or more speakers 116. For example, remote receiver 114 is any one of such receivers typically found in vehicles (e.g., receiver of a car radio system), but may generally be any remote receiver suitable for the purpose. For example, remote receiver 114 is any portable or non-portable radio receiver. Remote receiver 114 comprises one or more of a tuner, a demodulator, and an amplifier (not illustrated in FIG. 1) for detecting, demodulating, and/or amplifying signals as desired. In various embodiments, in addition to (or instead of) audio data, signals associated with other types of data (e.g., video data) may also be transmitted at the detected quiet spot frequency by the device 100.

Quiet spot determination unit 126 receives or otherwise detects signals on one or more radio communication frequencies to determine a quiet spot, and local transmitter antenna 112a transmits signals of voice, music, or other sounds and/or video at the frequency of the quiet spot to remote receiver 114 for amplification by way of one or more speakers 116. For example, device 100 is used in an automobile to allow a user to operate device 100 in a hands-free mode by amplifying the received audio signals over the automobile's speakers (e.g., car radio speakers). This application is useful, for example, in situations wherein device 100 is not configured to transmit such signals by way of a personal area network (using the Bluetooth™ specification, for example).

Device 100 is configured to store at least one indicator of at least one quiet spot frequency of the band. The indicator is, for example, a particular frequency value (e.g., 94.7 MHz). For example, if the local receiver 110 scans the frequency band (e.g., by tuning the local receiver 110 to one or more frequencies of the frequency band, to receive signals of the one or more frequencies that are being broadcast) searching for one or more quiet spots thereon, device 100 stores, at least temporarily, the frequency value(s) of detected quiet spot(s).

Device 100 also includes memory 118 or similar data storage means for storing one or more indicators of one or more frequencies. The local receiver 110 is configured to scan at least a portion of the frequency band to locate one or more quiet spots and then transfer to memory 118, or otherwise make available for retrieving, indicator(s) of the detected quiet spot(s).

Memory 118 comprises any data storage device for storing data at least temporarily. Memory 118 may be the same element of device 110 for storing audio data or may be a different storage element. Memory 118 may be a volatile memory device or a non-volatile memory device. Memory 118 may be a fully integrated memory device or may be a removable memory device (e.g., a USB flash drive or the like).

Local transmitter 112 is configured to receive or retrieve an indicator of at least one quiet spot frequency either directly from local receiver 110 or from one or more other components of device 100, such as, for example, from memory 118. Upon receiving or retrieving an indicator of the quiet spot frequency, local transmitter antenna 112a transmits signals at the received or retrieved frequency. The signals transmitted by local transmitter antenna 112a are analog or digital signals carrying information such as, for example, music or other sound, or video.

In various embodiments, after device 100 has determined a location of a quiet spot, a user tunes device 100 to the frequency of the quiet spot. Additionally or alternatively, device 100 is configured to automatically tune device 100 to the frequency of the quiet spot. As used herein, "automatically" refers to requiring no or limited action on the part of the user for causing the tuning to occur. So, in these embodiments, only limited interaction, if any, by the user is required for transmitting signals from device 100 to the remote device over the quiet spot frequency.

The user is informed of the location of the quiet spot by any method suitable for the purpose. For example, device 100 includes a display 120, which displays the frequency of the quiet spot or spots. Display 120 additionally or alternatively is configured to display status information such as, for example, information relating to whether device 100 is scanning a band to determine one or more quiet spots, storing an indication of a quiet spot, transmitting signals on the frequency of a quiet spot, or some combination thereof. Display 120 is configured to display information related to the signals transmitted by device 100 such as, for example, information related to the music being played (song data, artist data, etc.), information related to the telephone conversation being held (telephone number, length of call, etc.), and so forth.

Device 100 is configured to ensure that a frequency being used at any given time for transmitting audio signals to the remote receiver remains a quiet spot relative to other frequencies of the band. For these purposes, device 100 is configured to periodically determine (e.g., at regular or irregular intervals, or when requested by the user of the device 100) whether the set (or current) quiet spot is still a quiet spot by determining whether any change in the signal strength and/or signal to noise ratio of the quiet spot frequency has occurred. Such changes in signal strength and/or signal to noise ratio occurs, for example, in situations wherein device 100 is in transit (for example, while the user is driving) or over the course of time as broadcasting on the band changes.

Accordingly, device 100 is configured to periodically re-scan (e.g., by re-tuning the local receiver 110 to one or more frequencies of the frequency band, to receive signals of the one or more frequencies that are being broadcast) at least a portion of the frequency band to determine if any change in signal strength has occurred. Device 100 is configured to compare the current signal strength and/or signal to noise ratio against the stored signal strength and/or signal to noise ratio of previously-scanned frequencies for possibly jumping to a quieter spot. For example, device 100 re-evaluates the signal strength and/or signal to noise ratio of a detected quiet spot and sets it as the new quiet spot, or keeps jumping to another previously-detected quiet spot and so on until a quieter spot is found. In other embodiments, device 100 is configured to simply determine whether the signal strength and/or signal to noise ratio of the set quiet spot have changed rather than scanning multiple frequencies. If a change in the signal strength and/or signal to noise ratio of the set quiet spot has occurred, device 100 is configured to display a new quiet spot on display 120 and/or retune device 100 to transmit signals at another quiet spot.

The device 100 is configured such that if device 100 is shut down and then re-started, device 100 determines whether an indication of a location of a quiet spot is already stored on device 100 (such as, for example, in memory 118). Accordingly, a user avoids having to wait for device 100 to re-scan the radio band to find a quiet spot if the location of a quiet spot is already known. If a location of a quiet spot is not already stored on device 100, device 100 scans at least a portion of the radio band to locate one or more quiet spots. On the other hand, if an indication of a location of a quiet spot is already stored on device 100, device 100 transmits signals at a frequency corresponding to the location of the quiet spot stored on device 100. In various embodiments, the device 100 checks to determine if a quiet spot, previously stored in the device 100, is still a quiet spot, before operating using the previously stored quiet spot. If device 100 is not already tuned to transmit signals of the stored quiet spot frequency, device 100 is configured to tune device 100 to transmit signals at the frequency of the stored quiet spot. Device 100 is configured to display the frequency of the stored quiet spot on display 120.

Device 100 includes a control unit 122 configured to automatically tune remote receiver 114 to a frequency of a quiet spot. Control unit 122 is configured to set the remote receiver 114 to the frequency of the quiet spot with no or little action required on the part of the user. The control unit 122 is configured to enlist the Radio Data System (RDS) standard (sometimes alternately referred to as Radio Broadcast Data System (RBDS) standard) for re-tuning remote receiver 114 to the quiet spot frequency.

Control unit 122 communicates with, and re-tunes the remote receiver 114 over one or more wireless networks. In various embodiments, the control unit 122 transmits to, and re-tunes the remote receiver 114 over a FM link, although the principles of this disclosure are not limited to this aspect.

Figure 2:
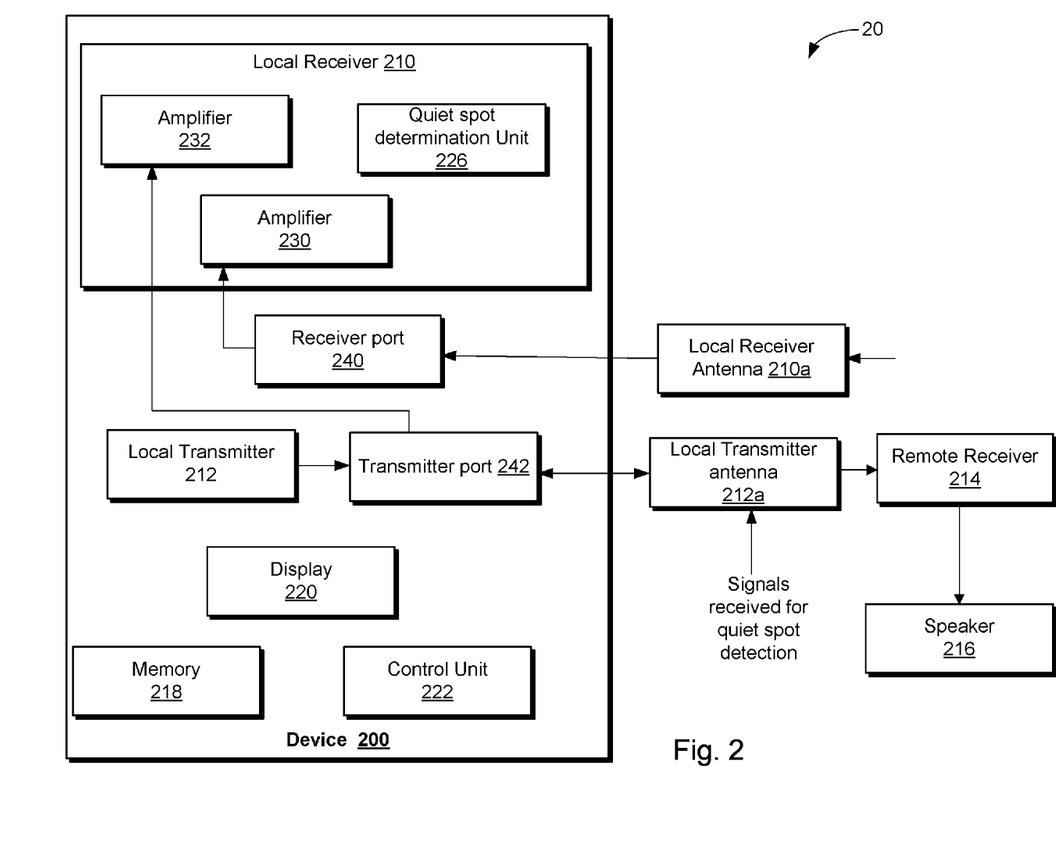
FIG. 2 schematically illustrates another system incorporating another device for quiet spot detection and transmission, in accordance with various embodiments of the present disclosure.

FIG. 2 schematically illustrates another system 20 incorporating another device 200 for quiet spot detection and transmission, in accordance with various embodiments of the present disclosure. The device 200 is at least in part similar to the device 100 of FIG. 2. For example, the device 200 includes a local transmitter antenna 212a, a memory 218, a display 220, a quiet spot determination unit 226 (e.g., included in a local receiver 210), a local transmitter 212, a local transmitter antenna 212a, and a control unit 222, which are at least in part similar to the corresponding components of device 100. Also, the remote receiver 214 and one or more speaker 216 of system 20 are at least in part similar to the corresponding components of FIG. 1. Although illustrated in FIG. 2 to be external to the device 200, in various embodiments, the local transmitter antenna 212a may be a part of and/or configured to be operatively coupled to the device 200. The local transmitter antenna 212a is coupled to one or more other components of the device 200 through a transmitter port 242.

A local receiver antenna 210a is external to, but configured to be operatively coupled to the device 200 (e.g., to the local receiver 210), as illustrated in FIG. 2. For example, the device 200 may be a cell phone, a digital audio player (e.g., an MP3 player), or any other appropriate sound producing device. An earphone or a headset of the device 200 is used as the local receiver antenna 210a when, for example, the earphone or the headset is operatively coupled to the device 200 (e.g., when the user is listening to an FM channel using the earphone or the headset of the device 200 that is also configured to receive FM signals). The local receiver antenna 210a is coupled to one or more other components of the device 200 through a receiver port 240.

The local receiver 210 scans a radio frequency band (e.g., an FM band), using the local receiver antenna 210a, for quiet spot detection. For example, the local receiver 210 tunes to each of a plurality of frequencies in the radio frequency band to process signals of each of the plurality of frequencies that are being broadcast (e.g., broadcast by other transmitters, including, for example, various radio signal broadcasting stations in the vicinity) and that are being received by the local receiver antenna 210a.

The local receiver 210 also includes a first amplifier 230 operatively coupled to the receiver port 240, and configured to amplify and process signals received by the receiver port 240 (e.g., from the local receiver antenna 210a). The amplifier 230 is, for example, a low noise amplifier (LNA).

The local transmitter antenna 212a is operatively coupled, through a transmitter port 242, to an amplifier 232 included in the local receiver 210.

In various embodiments, the local receiver antenna 210a is not always operatively coupled to the device 200. For example, as previously discussed, an earphone or a headset of the device 200 is used as the local receiver antenna 210a. However, the earphone or the headset may not always be operatively coupled to the device 200 (e.g., when the user of the device wants to use a remote sound producing device (e.g., a car radio speaker), instead of the earphone or the headset, to listen to sound produced by device 200).

For at least a portion of time while the local receiver antenna 210a is not operatively coupled to the device 200, the local transmitter antenna 212a acts as a receiver antenna and receives FM signals for the purpose of detecting quiet spot frequencies. The amplifier 232 amplifies signals received by the local transmitter antenna 212 in case the local transmitter antenna 212 is receiving signals (while the local receiver antenna 210a is not operatively coupled to the device 200) for detecting quiet spot frequencies. The amplifier 232 is, for example, an LNA. For at least this portion of time and for the purpose of detecting quiet spot frequencies, the local receiver 210 receives signal received by the local transmitter antenna 212s, and the local receiver 210 scans a radio frequency band (e.g., an FM band) for quiet spot detection. For example, the local receiver 210 tunes, using signals received from the local transmitter antenna 212a, to each of a plurality of frequencies in the radio frequency band to receive signals of each of the plurality of frequencies that are being broadcast.

The quiet spot determination unit 226 receives output of the amplifier 230 and/or amplifier 232, and evaluates one or more frequencies of a frequency band to determine a quiet spot frequency. The quiet spot determination unit 226 evaluates signal to noise ratio and/or signal strength of various frequencies (e.g., received by the local receiver 210 or the local transmitter 212), and determines one or more quiet spot frequencies based on any one or both these indicators, as previously discussed in more detail.

Once the quiet spot has been determined, the local transmitter 212 transmits signals, through the local transmitter antenna 212a, over the determined quiet spot frequency. Device 200 also includes the control unit 222 configured to automatically tune a remote receiver 214 to a frequency of the determined quiet spot. Control unit 222 is configured to set the remote receiver 214 to the frequency of the quiet spot with no or little action required on the part of the user. For example, the control unit 222 is configured to enlist the Radio Data System (RDS) standard (sometimes alternately referred to as Radio Broadcast Data System (RBDS) standard) for tuning remote receiver 214 to the quiet spot frequency, as previously discussed. In various embodiments, an initial setting of the remote receiver 214 (e.g., initially tuning the remote receiver 214 during a first use, e.g., after the remote receiver 214 is reset or is switched on) may be performed, for example, by a user of the device 200, while subsequent tuning of the remote receiver 214 may be performed automatically by the control unit 222.

The remote receiver 214 may be a part of a sound producing arrangement (e.g., part of a car radio system), which includes one or more speakers 216. Upon being appropriately tuned (e.g., by the control unit 222 and/or by the user of the device 200) at the quiet spot frequency, the remote receiver 214 receives signals transmitted by the local transmitter 212 at the quiet spot frequency and produces sound in the associated sound producing arrangement (e.g., in the one or more speakers 216).

Figure 3:
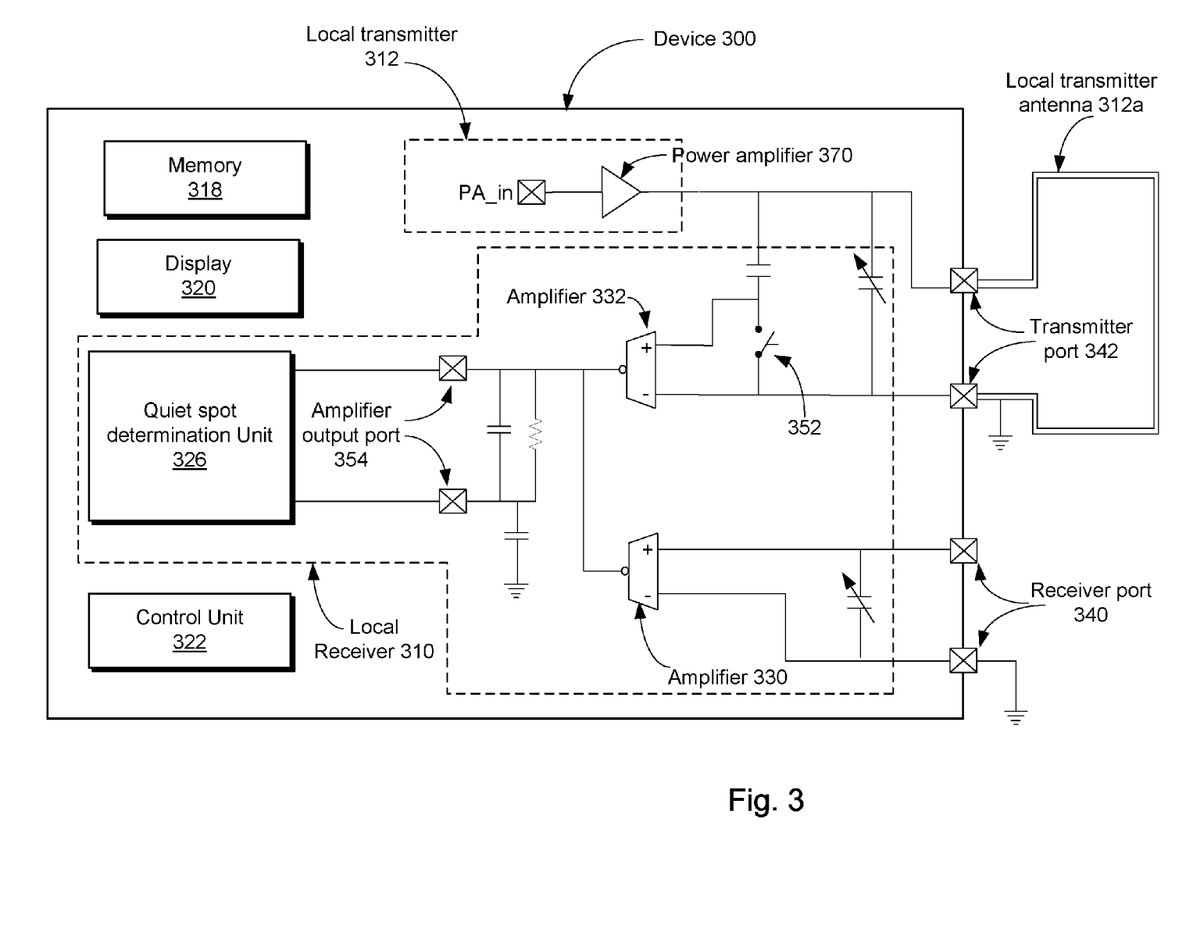
FIG. 3 schematically illustrates another device for quiet spot detection and transmission, in accordance with various embodiments of the present disclosure.

FIG. 3 schematically illustrates another device 300 for quiet spot detection and transmission, in accordance with various embodiments of the present disclosure. The device 300 is at least in part similar to the devices of FIGS. 1 and/or 2. For example, the device 300 includes a local transmitter 312 (illustrated by dotted lines), a local transmitter antenna 312a, a local receiver 310 (also illustrated by dotted lines), a memory 318, a display 320, a receiver port 340, a transmitter port 342, a control unit 322, amplifiers 330 and 332 (included in the local receiver 310), and a quiet spot determination unit 326 (included in the local receiver 310), which are at least in part similar to the corresponding components of devices 100 and/or 200 of FIGS. 1 and 2, respectively.

As previously discussed, there may be situations when a local receiver antenna is not operatively coupled to the receiver port. In the embodiment of FIG. 3, no local receiver antenna is operatively coupled to the receiver port 340. However, in various other embodiments, a local receiver antenna may be operatively coupled to the receiver port 340.

In device 300, the amplifier 330 is coupled to the receiver port 340, and is configured to process signals received in the receive port from a local receiver antenna (not illustrated in FIG. 3), in case such a local receive antenna is operatively coupled to the receiver port 340.

Also, the amplifier 332 is coupled to the transmitter port 342, and is configured to process signals received by the local transmitter antenna 312a for determination of quiet spot frequency (e.g., while a local receiver antenna is not operatively coupled to the device 300). The transmitter port 342 is also operatively coupled to a power amplifier 370 included in the local transmitter 312. The power amplifier 370 is a part of a transmission path of the device 300, which processes signals before transmission by the local transmitter antenna 312a.

In certain situations and for certain types of FM transmission devices, local regulations (e.g., regulation enacted by Federal Communication Commission (FCC) in the United States) may require that the FM transmitter be always connected to a transmission path of the device. Accordingly, unlike the local receiver antenna, the local transmitter antenna 312a is configured to not be decoupled and/or removed from the device 300 while the device 300 is operational. That is, the local transmitter antenna 312a is configured to be always (e.g., whenever the device 300 is operating) operatively coupled to the transmission path (that includes, among other components, the local transmitter 312 comprising at least the power amplifier 370). The local transmitter antenna 312a is operatively coupled to the transmission path (e.g., the local transmitter 312), even while the local transmitter antenna 312a is in a receive mode (e.g., when the local receiver antenna is decoupled from local receiver port 310 and the local transmitter antenna 312a is receiving signals for determination of quiet spot frequency). Also, the amplifier 332 (controlled by switch 352) is coupled to the local transmitter antenna 312a only when the local transmitter antenna 312a is in the receive mode.

The device 300 also includes amplifier output port 354, which outputs signal from amplifier 332 or amplifier 330, based on, for example, the connectivity of the local receiver antenna 310*a* to the device 300.

Device 300 also comprises the quiet spot determination unit 326 included in the local receiver 310. The quiet spot determination unit 326 receives output from the amplifiers 330 and/or 332 (e.g., through the amplifier output port 354), determines a signal to noise ratio indicator and/or a signal strength indicator from the received output, and determines one or more quiet spot frequencies based on any one or both these indicators, as previously discussed in more detail. The memory 318 stores, among other data, an indication of the determined quiet spot frequency or frequencies. The display 320 displays, among other information, the quiet spot frequency or frequencies. The control unit 322 is configured to automatically tune a remote receiver (not illustrated in FIG. 3) to one of the determined quiet spot frequencies.

Embodiments of the present disclosure are directed to methods and apparatuses for quiet spot detection for wireless transmission. According to various embodiments, a device is configured to scan a frequency band to detect one or more quiet spots; the device further includes a transmitter configured to tune the device to one of the detected quiet spots. The device is configured to convert data stored on the device to signals, and transmit the signals over one of the quiet spot frequencies, which is detected by a remote device such as, for example, a receiver of a remote radio, television, or other device suitable for the purpose. Accordingly, the disclosed methods and apparatuses obviates the need for the user to manually scan the frequency band to determine the frequency of a quiet spot and then manually tune the transmitter to the quiet spot frequency for transmitting data to the remote device.

Figure 4:
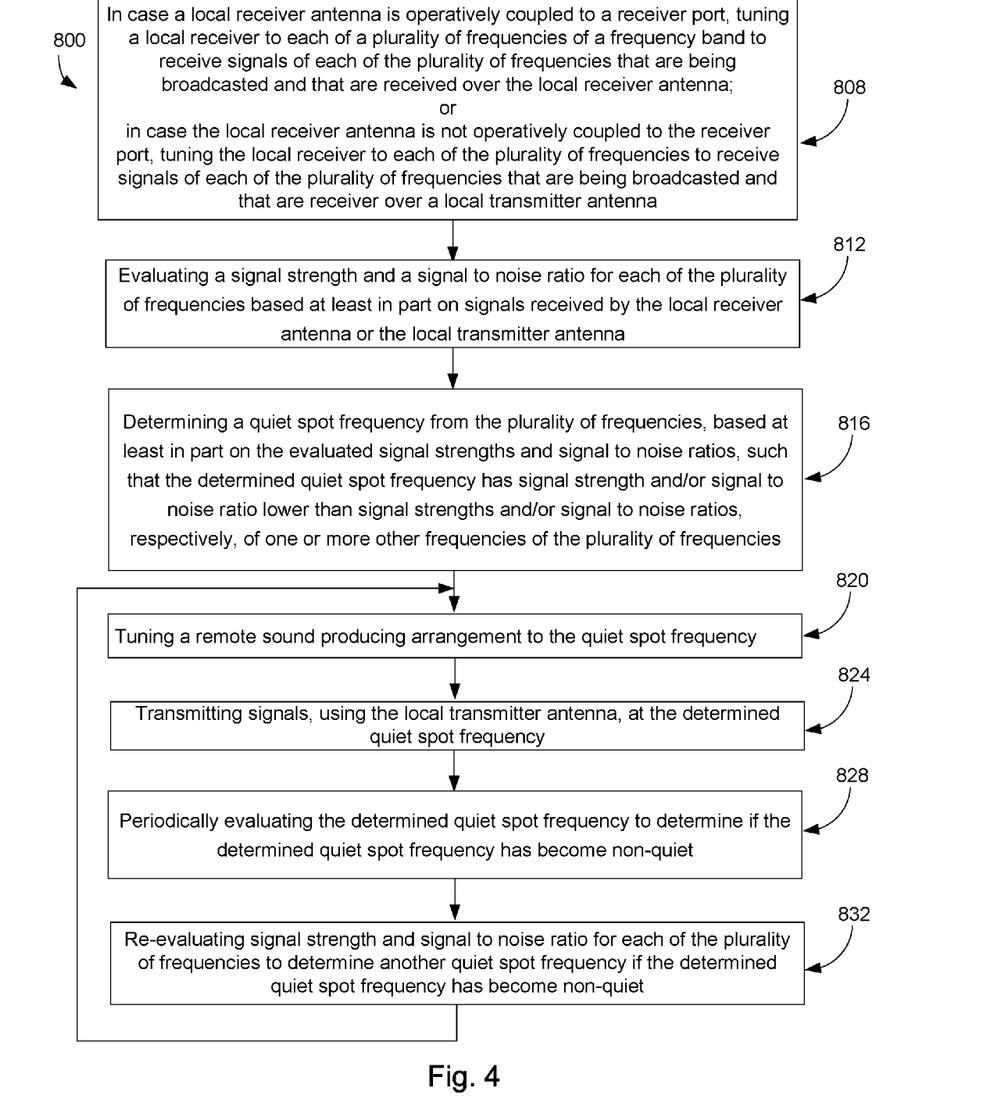
FIG. 4 illustrates an exemplary method for quiet spot detection and transmission, in accordance with various embodiments of the present disclosure.

FIG. 4 illustrates an exemplary method 800 for quiet spot detection and transmission, in accordance with various embodiments of the present disclosure. The method 800 is suitable for the devices of FIGS. 1-3. Referring to FIG. 4, the method 800 includes, at 808, tuning a local receiver (e.g., local receiver 110, 210 or 310 of FIGS. 1-3) to each of a plurality of frequencies of a frequency band to receive signals of each of the plurality of frequencies that are being broadcast (e.g., broadcast by other transmitters, including, for example, various radio signal broadcasting stations in the vicinity) and that are received over a local receiver antenna (e.g., local receiver antenna 110*a* or 210*a*), in case the local receiver is operatively coupled to a receiver port (e.g., receiver port 240 or 340 of FIGS. 2-3). The signals received by the local receiver antenna are amplified using a first amplifier (e.g., amplifier 230 or 330 of FIGS. 2-3), in case the local receiver antenna is operatively coupled to the receiver port. The frequency band is, for example, a frequency modulation (FM) frequency band.

However, in case the local receiver antenna is not operatively coupled to the receiver port, the method comprises, at 808, tuning the local receiver to each of the plurality of frequencies to receive signals of each of the plurality of frequencies that are being broadcast and that are being received over a local transmitter antenna (local transmitter antenna 112*a*, 212*a* or 312*a*). The signals received by the local transmitter is amplified using a second amplifier (e.g., amplifier 232 or 332 of FIGS. 2-3), in case the local receiver is not operatively coupled to the receiver port.

The method 800 further comprises, at 812, evaluating signal strength and signal to noise ratio for each of the plurality of frequencies based at least in part on signals received by the local receiver antenna or the local transmitter antenna. Such evaluation is performed, for example, by the quiet spot determination unit 126, 216 or 316 of FIGS. 1-3.

The method 800 further comprises, at 816, determining (e.g., by the quiet spot determination unit) one or more quiet spot frequency or frequencies from the plurality of frequencies, based at least in part on the evaluated signal strengths and signal to noise ratios, such that the determined quiet spot frequency has signal strength and/or signal to noise ratio lower than signal strengths and/or signal to noise ratios, respectively, of one or more other frequencies of the plurality of frequencies of the frequency band.

The method 800 further comprises, at 820, tuning (e.g., using the control unit 122, 222 or 322) a remote sound producing arrangement (e.g., remote receiver 114 or 214) to one of the determined quiet spot frequencies. The method 800 further comprises, at 824, transmitting signals, using the local transmitter, at the determined quiet spot frequency.

The method 800 further comprises, at 828, periodically (e.g., at regular or irregular intervals, or upon a request by a user of the device) evaluating the determined quiet spot frequency to determine if the determined quiet spot frequency has become non-quiet. For example, it is determined that the previously determined quiet spot frequency has become non-quiet if the signal strength or the signal to noise ratio of the determined quiet spot frequency becomes higher than a threshold signal strength or a threshold signal to noise ratio, respectively. If the determined quiet spot frequency has become non-quiet, the method comprises, at 832, re-evaluating signal strength and signal to noise ratio for each of the plurality of frequencies to determine another quiet spot frequency. The operations at 820, 824, 828 and/or 832 continue until, for example, intervened by the user of device.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A device comprising:
    a receiver port configured to be operatively coupled to a local receiver antenna;
    a transmitter port configured to be operatively coupled to a local transmitter antenna and to receive signals received by the local transmitter antenna at least for a portion of time while the local receiver antenna is not operatively coupled to the receiver port; and
    a quiet spot determination unit configured to:
        receive signals received by the local receiver antenna at least for a portion of time while the local receiver antenna is operatively coupled to the receiver port;
        receive signals received by the local transmitter antenna at least for the portion of time while the local receiver antenna is not operatively coupled to the receiver port; and
        determine a quiet spot frequency.

2. The device of claim 1, wherein the quiet spot determination unit is further configured to:
    evaluate at least signal strength or signal to noise ratio for each of a plurality of frequencies of a frequency band based at least in part on signals received from the local receiver antenna or the local transmitter antenna; and
    determine the quiet spot frequency from the plurality of frequencies, based at least in part on the evaluated signal strengths or signal to noise ratios.

3. The device of claim 2, wherein the quiet spot frequency has signal strength that is lower than the evaluated signal strengths of one or more other frequencies of the plurality of frequencies in the frequency band.

4. The device of claim 2, wherein the quiet spot frequency has signal to noise ratio that is lower than signal to noise ratios of one or more other frequencies of the plurality of frequencies in the frequency band.

5. The device of claim 1, wherein the quiet spot determination unit is further configured to:
periodically evaluate the determined quiet spot frequency to determine if the determined quiet spot frequency has become non-quiet; and
re-evaluate the signal strength or the signal to noise ratio for each of the plurality of frequencies to determine another quiet spot frequency if the determined quiet spot frequency has become non-quiet.

6. The device of claim 5, wherein the quiet spot determination unit is further configured to determine that the quiet spot frequency has become non-quiet if the signal strength or the signal to noise ratio of the determined quiet spot frequency becomes higher than a threshold signal strength or a threshold signal to noise ratio, respectively.

7. The device of claim 1, further comprising:
a first amplifier operatively coupled to the receiver port and configured to process signals received by the local receiver antenna; and
a second amplifier operatively coupled to the transmitter port and configured to process signals received by the local transmitter antenna.

8. The device of claim 1, wherein the local transmitter antenna is configured to transmit signals at the determined quiet spot frequency.

9. The device of claim 1, further comprising a control unit configured to tune a remote sound producing arrangement to the determined quiet spot frequency.

10. The device of claim 1, wherein the device is a wireless handheld device or a digital audio player, and wherein the local receiver antenna is an earphone or a headset of the device.

11. A method comprising:
evaluating at least a signal strength and signal to noise ratio for each of a plurality of frequencies of a frequency band, wherein evaluating the signal strength and the signal to noise ratio for each of the plurality of frequencies further comprises
if a local receiver antenna is operatively coupled to a receiver port, tuning a local receiver to each of the plurality of frequencies to receive signals of each of the plurality of frequencies that are being broadcast and that are received by the local receiver antenna,
if the local receiver antenna is not operatively coupled to the receiver port, tuning the local receiver to each of the plurality of frequencies to receive the signals of each of the plurality of frequencies that are being broadcast and that are received by a local transmitter antenna, and
evaluating the signal strength and the signal to noise ratio for each of the plurality of frequencies based at least in part on signals received by the local receiver antenna or the local transmitter antenna;
determining a quiet spot frequency from the plurality of frequencies, based at least in part on the evaluated signal strengths and signal to noise ratios; and
transmitting signals at the determined quiet spot frequency.

12. The method of claim 11, wherein the determined quiet spot frequency has a signal strength lower than the evaluated signal strengths of one or more other frequencies of the plurality of frequencies of the frequency band.

13. The method of claim 11, wherein the determined quiet spot frequency has signal to noise ratio lower than the evaluated signal to noise ratios of one or more other frequencies of the plurality of frequencies of the frequency band.

14. The method of claim 11, further comprising:
periodically evaluating the quiet spot frequency to determine if the quiet spot frequency has become non-quiet; and
if the evaluated quiet spot frequency has become non-quiet, re-evaluating the signal strength or the signal to noise ratio for each of the plurality of frequencies to re-determine another quiet spot frequency.

15. The method of claim 11, wherein evaluating the signal strength and the signal to noise ratio for the plurality of frequencies further comprises:
amplifying, using a first amplifier, signals received by the local receiver antenna in case the local receiver antenna is operatively coupled to the receiver port; and
amplifying, using a second amplifier, signals received by the local transmitter antenna in case the local receiver antenna is not operatively coupled to the receiver port.

16. The method of claim 11, wherein the frequency band is a frequency modulated (FM) frequency band.

17. A method comprising:
tuning a device to each of a plurality of frequencies in a frequency band to receive signals of each of the plurality of frequencies that are being broadcast, wherein tuning to each of the plurality of frequencies further comprises
if a local receiver antenna is operatively coupled to a receiver port of the device, tuning the device to each of the plurality of frequencies received by the local receiver antenna, and
if a local receiver is not operatively coupled to the receiver port of the device, tuning the device to each of the plurality of frequencies received by a local transmitter antenna;
evaluating at least signal strength and signal to noise ratio for each of the plurality of frequencies, based at least in part on said tuning; and
determining a quiet spot frequency from the plurality of frequencies, based at least in part on the evaluated signal strengths and signal to noise ratios.

18. The method of claim 17, further comprising:
tuning a remote sound producing arrangement to the quiet spot frequency; and
transmitting, by the device using the local transmitter antenna, signals at the determined quiet spot frequency.

* * * * *